UNITED STATES PATENT OFFICE.

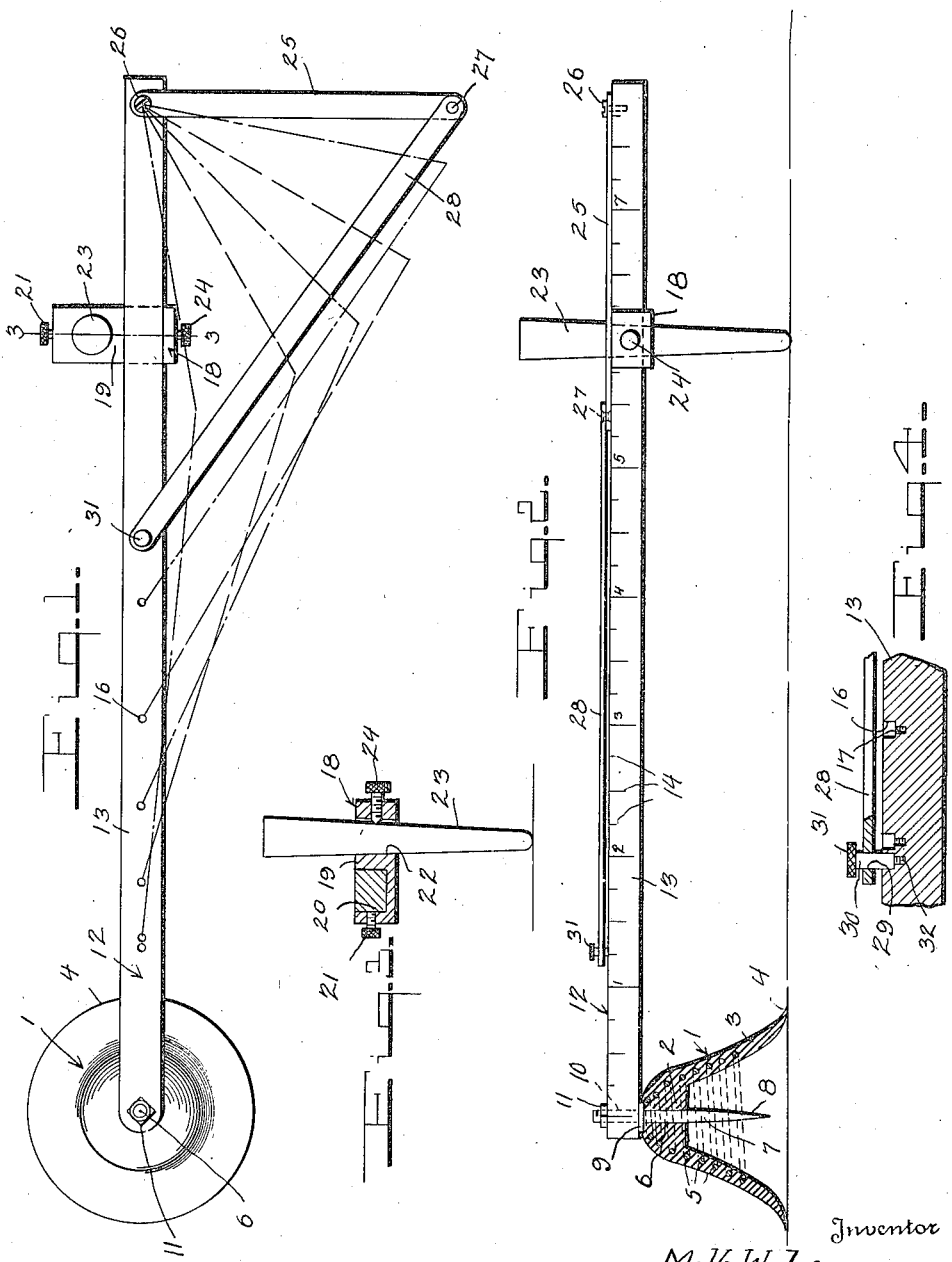

MILES V. WOLF, OF ASHLAND, OHIO.

COMBINATION COMPASS AND PROTRACTOR.

1,244,272.

Specification of Letters Patent.

Patented Oct. 23, 1917.

Application filed December 7, 1915. Serial No. 65,529.

*To all whom it may concern:*

Be it known that I, MILES V. WOLF, a citizen of the United States, residing at Ashland, in the county of Ashland and State of Ohio, have invented certain new and useful Improvements in Combination Compasses and Protractors; and I do hereby declare the following to be a full, clear, and exact description of the invention, such as will enable others skilled in the art to which it appertains to make and use the same.

This invention relates to new and useful improvements in combination compasses and protractors and the principal object of the invention is to provide a beam compass which is adapted to be attached to plain surfaces by a vacuum cup thereby avoiding injury to the surfaces.

Another object of the invention is to provide a compass of the beam type provided with a means for determining the relative inclination of lines and also for drawing lines of various degrees of inclination with relation to the beam of the compass.

Still another object of the invention is to provide a beam compass having a vacuum cup for holding the same in proper position and provided with a centering point which materially assists in the proper positioning of the center of the compass.

With these and other objects in view, the invention consists in the novel combination and arrangement of parts as will be fully set forth in the following specification and accompanying drawings, in which:—

Figure 1 is a top plan view of a beam compass constructed in accordance with this invention, showing the protractor attachment as it would appear in use and illustrating diagrammatically the various positions of said attachment.

Fig. 2 is a side view of Fig. 1 showing the protractor attachment in its folded position.

Fig. 3 is a transverse sectional view on line 3—3 of Fig. 1, and

Fig. 4 is a fragmentary longitudinal sectional view of the compass beam showing a portion of the protractor attachment.

Referring to the drawing, the numeral 1 designates as an entirety the vacuum cup of the compass consisting of the body 2 formed of soft rubber or the like which is provided with the outwardly flared walls 3, the edges 4 of which are reduced in thickness so that at the terminal of the walls the edges are relatively sharp. A suitable coil spring 5 is embedded in the walls 3 and in the body 2 and is adapted to reinforce the same so as to materially strengthen the cup and prevent the walls from collapsing. Embedded centrally of the bottom is the pin or stake 6, the lower end of which projects downwardly as at 7 and is pointed at 8 and the pointed end is positioned directly in the center of the edges of the side walls 3 as illustrated in the drawings so as to assist in the centering of the device. A suitable washer or collar 9 is formed in the upper end of the pin or stake 6 and forms a bearing against which the under side of the beam engages. Extending upwardly from the washer or collar 9 is a shank or pivot stem 10, threaded at its upper end to receive the nut 11 which holds the compass beam in place.

The beam is designated generally by the numeral 12 and comprises a body 13 provided with a plurality of graduations 14 at spaced intervals on one of the side faces. The top face is provided with a plurality of spaced depressions 16 having the recesses 17 formed centrally of a bottom wall which are preferably internally screw threaded to receive the threaded extension on the thumb screw of the protractor attachment which will be more fully hereinafter described. The inner end of the body 13 is pivotally mounted on the extension 11 and slidable on said body is the carriage designated by the numeral 18 carrying a chalk or pencil which is adapted for describing the curved line. This carriage consists of the body 19 provided with a transverse groove 20 of a size sufficient to receive the beam 13. A thumb screw 21 extends through one of the walls of the groove and is adapted for frictional engagement with the side of the beam to hold the carriage in adjustable positions thereon. Extending vertically through the body 19 is a tapered opening 22 which is adapted for the reception of the chalk or pencil 23 which in turn is held by a suitable thumb screw 24 extending through the outer side wall of the opening 22. In this way it will be seen that the chalk will be held in operative relation to the vacuum cup 1 and may be adjusted vertically so as to engage the surface upon which the arc is to be described.

The protractor attachment which is adapted for use with the device consists of a protractor arm 25 pivoted at 26 to the outer end of the beam and which is pivoted at its outer end 27 to the adjusting link 28, the opposite end of the link 28 being provided with an aperture 29 for the reception of the smooth portion 30 of the shank of the thumb screw 31. A reduced threaded extension 32 is formed at the lower end of the smooth portion 30 and is adapted for engagement with the threads in the recesses 17 to hold the protractor arm 25 in various adjusted positions as indicated in Fig. 1.

It will be apparent from the foregoing that in describing arcs, the vacuum cup 1 is placed at the desired point so that the point 8 rests directly over the center of the arc whereupon the carriage 18 is adjusted to proper position on the arm and the chalk or pencil 23 is then adjusted so as to engage the surface upon which the arc is to be drawn whereupon the beam 12 is swung on its pivot pin thus causing the chalk 23 to travel in an arcuate path and describe the desired line on the surface.

When the device is used as a protractor, it will be seen that the thumb screw 31 is moved so as to engage in any of the various recesses 16, thereby swinging the arm 25 on its pivot and moving the same into the various positions illustrated by the dot and dash lines so that the lines extend at various degrees of angles with relation to the beam 12. In this way it will be seen that the inclination of lines may be measured and also lines of various inclinations may be drawn.

While in the foregoing there has been shown and described the preferred embodiment of this invention, it is to be understood that such changes may be made in the combination and arrangement of parts as will fall within the spirit and scope of the appended claims.

What is claimed is:—

1. A compass comprising a vacuum cup, a reinforcing spring embedded in said cup, a pin centrally of the vacuum cup, said pin extending into the cup and being pointed at its inner end, the pin forming a centering device, a beam pivoted to the upper end of the pin and a pencil carriage slidable on the beam.

2. A device of the class described comprising a vacuum cup, a coil spring embedded in said cup to provide a reinforcing means therefor, a pin embedded centrally of the cup, the upper end of the pin extending beyond the upper side of the cup, the lower end of the pin extending into the interior of the cup and being sharpened to provide a centering device, a beam pivoted to the upper end of the pin, and a stylus carriage adjustably mounted on the beam.

3. In a compass, a beam, a central carriage slidable on said beam, an inverted cup, a thickened base portion for said cup, a centering pin extending through the thickened base portion to assist in the centering of the cup a part of said pin being disposed within the cup, the opposite end of said pin projecting beyond the cup and forming a pivotal connection for the beam, the walls of the cup tapering toward its edge to provide a relatively thin engaging portion and a coiled spring embedded in the wall of the cup and in the base portion to reinforce the cup.

In testimony whereof I affix my signature in presence of two witnesses.

MILES V. WOLF.

Witnesses:
   Mrs. A. A. HINER,
   J. F. HENDERSON.